(12) United States Patent
Yumita

(10) Patent No.: US 6,509,652 B2
(45) Date of Patent: Jan. 21, 2003

(54) SMALL-SIZED HYDROELECTRIC POWER GENERATING APPARATUS

(75) Inventor: Yukinobu Yumita, Nagano (JP)

(73) Assignees: Kabushiki Kaisha Sankyo Seiki Seisakusho, Nagano (JP); Toto Ltd., Fukuoka (JP)

(*) Notice: Subject to any disclaimer, the term of this patent is extended or adjusted under 35 U.S.C. 154(b) by 0 days.

(21) Appl. No.: 09/946,471

(22) Filed: Sep. 6, 2001

(65) Prior Publication Data

US 2002/0047374 A1 Apr. 25, 2002

(30) Foreign Application Priority Data

Sep. 6, 2000 (JP) ........................................ 2000-269746

(51) Int. Cl.$^7$ ............................. F16K 31/02; H02K 5/00
(52) U.S. Cl. ............................. 290/54; 310/87; 310/89
(58) Field of Search ............................ 310/87, 85, 88, 310/40 MM, 89, 91; 290/54, 53; 417/423.14, 424.1

(56) References Cited

U.S. PATENT DOCUMENTS

| | | | | |
|---|---|---|---|---|
| 4,518,886 A | * | 5/1985 | Kaneyuki | 310/87 |
| 5,440,175 A | * | 8/1995 | Mayo, Jr. et al. | 290/54 |
| 5,648,694 A | * | 7/1997 | Kobayashi et al. | 310/87 |
| 5,796,197 A | * | 8/1998 | Bookout | 310/87 |
| 6,208,037 B1 | * | 3/2001 | Mayo, Jr. et al. | 290/54 |

FOREIGN PATENT DOCUMENTS

JP   2-65775   5/1990   ........... F16K/31/05

* cited by examiner

*Primary Examiner*—Tran Nguyen
(74) *Attorney, Agent, or Firm*—Sughrue Mion, PLLC

(57) ABSTRACT

In a small-sized hydroelectric power generating apparatus in which a waterwheel 3 arranged in a fluid path and rotating with passage of a prescribed flow rate of fluid, a rotating body 4 coupled with the waterwheel and rotating therewith is used as a rotor portion arranged oppositely to a stator portion 6, and the rotor portion is rotated relatively to the stator portion 6 with passage of the fluid to generate electric power, the small-sized hydroelectric generation includes a continuous internal space formed when a first case 1 and a second case 5 are fit to each other, said first case having an inlet 12 and an outlet 13 of said fluid path and said second case having the internal space which communicates with said inlet and outlet and in which said rotating body is arranged and separating the internal space from the stator portion, wherein a concave portion 14 is provided at a fitting portion between said first case and said second case; an opposite wall 5a opposite to the inner wall of said concave portion or the outer wall of said convex portion is provided at the fitting portion between said first case and said second case; a ring-shaped sealing member 8 is provided which is interposed between said opposite wall and the inner wall of said concave portion 14 in a direction orthogonal to the direction of fitting said second case into said first case, and said first case 1 and said second case 5 are provided with supporting portions 11b, 5f, respectively which support both ends of a shaft 7 supporting said rotating body 4.

7 Claims, 4 Drawing Sheets

SMALL-SIZED HYDROELECTRIC POWER GENERATING APPARATUS

BACKGROUND OF INVENTION

1. Field of Invention

The present invention relates to a small-sized hydroelectric power generating apparatus using water power generated by flow of water passing through a faucet.

2. Related Art

Conventionally, an automatic water faucet apparatus has been it widely known in which a sensor detects the fact that a user holds out his hand below a faucet and on the basis of the detection, water is caused to flow from the faucet. In recent years, an apparatus has also been proposed in which a small-sized hydraulic generator is arranged on a fluid passage of such an automatic water faucet apparatus, the electric power acquired by the small-sized hydroelectric power generating apparatus is stored and power consumption in the circuit such as the above sensor is supplemented with the electric power thus stored (Unexamined Japanese Utility Model Publication Hei. 2-65775).

A brief explanation will be given of the configuration of the small-sized hydraulic generator described above. A waterwheel is arranged on a fluid passage which constitutes a passage for running water. When the waterwheel undergoes hydraulic force of the running water, it rotates. A rotary shaft of the waterwheel is provided with a rotating body fixed integrally. The outer periphery of the rotating body serves as a magnetized rotor magnet which is opposite to a stator pole across a wall of a non-magnetic material. A stator coil is provided so as to cross the magnetic flux passing through the stator pole. When the waterwheel undergone the power of the running water rotates, the rotor magnet rotates relatively to the stator pole. Since the rotor magnet has been magnetized in multiple poles, a change occurs in the flow the magnetic flux passing through the stator. As a result, an electromotive force is generated in the stator coil in the direction of disturbing the change in the flow of the magnetic flux. The electromotive force is rectified and stored in a battery.

Conventionally, in the small-sized hydroelectric power generating apparatus having a structure in which the waterwheel is arranged in the fluid passage, both ends of the rotary shaft of the waterwheel are supported by different members. Specifically, the one end of the rotary shaft is supported by a bearing which is provided within one case body provided with the fluid passage, whereas the other end of the rotary shaft is supported by another bearing which is provided in the other case body covering a power generating portion. The waterwheel, which rotates integrally to the rotary shaft supported by the different members at both ends, is arranged within a space formed when the two case bodies are coupled with each other in the axial direction of the rotary shaft.

Incidentally, the inner wall of the above when the two case bodies are coupled with each other in the axial direction, over the entire periphery of the coupled portion, a sealing member, concretely e.g. a rubber member, for partitioning an internal space from the outside is arranged. The sealing member is pressed by both case bodies. This configuration enhances the degree of sealing the internal space.

However, when both case bodies are coupled with each other by screwing, the pressing force for the sealing member inclines at different positions. Specifically, the pressing force is high in the vicinity of the screwed position whereas it is low at a position remote from the screwed position. Further, both case bodies undergo repelling force of the rubber member squashed by the pressing force.

Because of such inclination of the pressing force and the repelling force, the case bodies may be deformed. When the case bodies are deformed, a problem is presented regarding the accuracy of the rotary shaft which rotates integrally to the waterwheel. Further, the portion which undergoes the low pressing force becomes unstable so that the sealing of the portion becomes to a problem. In addition, because both cases are coupled with each other through the sealing member which may be deformed by pressing as described above, it is difficult to align both case bodies.

SUMMARY OF INVENTION

In view of the above problems, this invention intends to provide a small-sized hydroelectric power generating apparatus which improves the sealing of a continuous internal space formed when a case body covering a generating portion and another case body forming a fluid passage are coupled with each other, and gives great accuracy of a shaft arranged within the internal space.

In a small-sized hydroelectric power generating apparatus in which a waterwheel arranged in a fluid path and rotating with passage of a prescribed flow rate of fluid, a rotating body coupled with the waterwheel and rotating therewith is used as a rotor portion arranged oppositely to a stator portion, and the rotor portion is rotated relatively to the stator portion with passage of the fluid to generate electric power, the small-sized hydroelectric power generating apparatus according to this invention is provided by including a continuous internal space formed when a first case and a second case are fit to each other, the first case having an inlet and an outlet of the fluid path and the second case having the internal space which communicates with the inlet and outlet and in which the rotating body is arranged and separating the internal space from the stator portion, and in that a concave or convex portion is provided at a fitting portion between the first case and the second case; an opposite wall opposite to the inner wall of the concave portion or the outer wall of the convex portion is provided at the fitting portion between the first case and the second case; a ring-shaped sealing member is provided which is interposed between the opposite wall and the inner wall of the concave portion or the outer wall of the convex portion in a direction orthogonal to the direction of fitting the second case into the first case, and the first case and the second case are provided with supporting portions which support both ends of a shaft supporting the rotating body.

In accordance with this invention, after the first case and second case have been fit to each other, the elastic sealing member is not pressed in the fitting direction, and the elastic sealing member undergoes pressing force from both cases in a direction orthogonal to the fitting direction. Therefore, both cases do not suffer from an inconvenience such as a secular deformation due to elastic repelling force of the elastic sealing member in the fitting direction, and can be arranged at improved accuracy. Hence, the accuracy of the shaft supporting the rotating body and supported by both cases in both ends thereof is also improved. Further, the fitting potion between both cases is difficult to float, thereby improving the sealing of both cases.

In the above invention, the small-sized generator according to another invention is provided in that the opposite wall and the inner wall of the concave portion or the outer wall of the convex portion are formed in parallel to the shaft supporting the rotating body. Therefore, the fitting direction between the first case and the second case is coincident with the axial direction. Thus, the locating accuracy of both cases and shaft accuracy can be further improved.

Further, in the above invention, the small-sized generator according to still another invention is provided in that the first case includes a positioning portion for positioning the second case in a direction orthogonal to the fitting direction of fitting the second case. Therefore, when the first case and second case are fit to each other, the second case is positioned in this direction as well as the fitting direction. Thus, locating accuracy of both cases can be further improved.

Further, in the above invention, the small-sized generator according yet another invention is provided in that the elastic sealing member is arranged to be laminated on the stator portion in the direction orthogonal to the fitting direction.

Further, in the above invention, the small-sized hydroelectric power generating apparatus according to a further invention is provided in that a concave portion is formed at the fitting portion between the first case and the second case, a step is formed on the inner wall of the concave portion, a region located inside the step in a radial direction is used as the positioning portion and the elastic sealing member is arranged on the step.

Further, in the above invention, the small-sized hydroelectric power generating apparatus according to a further invention is provided in that the positioning portion for the second case is provided on a deep side of the step in the fitting direction. Therefore, the operation of placing the elastic sealing member and fitting the second case in the first case can be facilitated.

Further, in the above invention, the small-sized hydroelectric power generating apparatus is provided in that a third case is put on the second case and the stator portion so as to cover them, and the third case is securely screwed to the first case. Therefore, secure fitting between the first case and the second case is reinforced by screwing of the third case to the first case so that coming-off of the first case and second case from each other is prevented. In addition, the third case is put on the stator so as to cover it so that water is prevented from intruding into the stator portion from the outside.

DETAILED DESCRIPTION OF PREFERRED EMBODIMENTS

Figure 1:
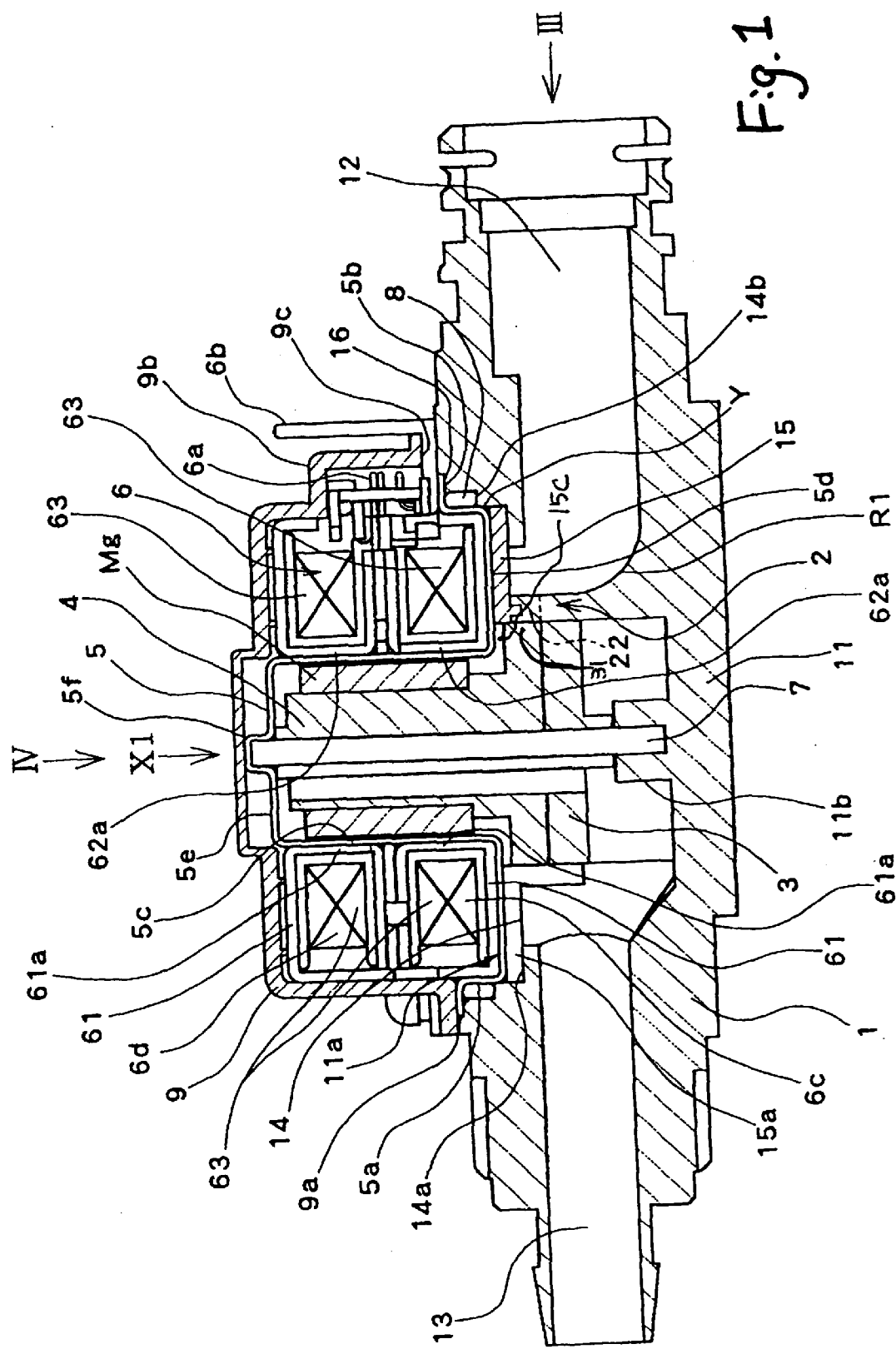
FIG. 1 is a longitudinal sectional view of a small-sized hydroelectric power generating apparatus according to an embodiment of this invention.

Now referring to FIGS. 1 to 4, an explanation will be given of a small-sized hydroelectric power generating apparatus which is an embodiment of this invention. FIG. 1 is a longitudinal cross-sectional view of the small-sized hydroelectric power generating apparatus which is the embodiment of this invention.

Figure 2:
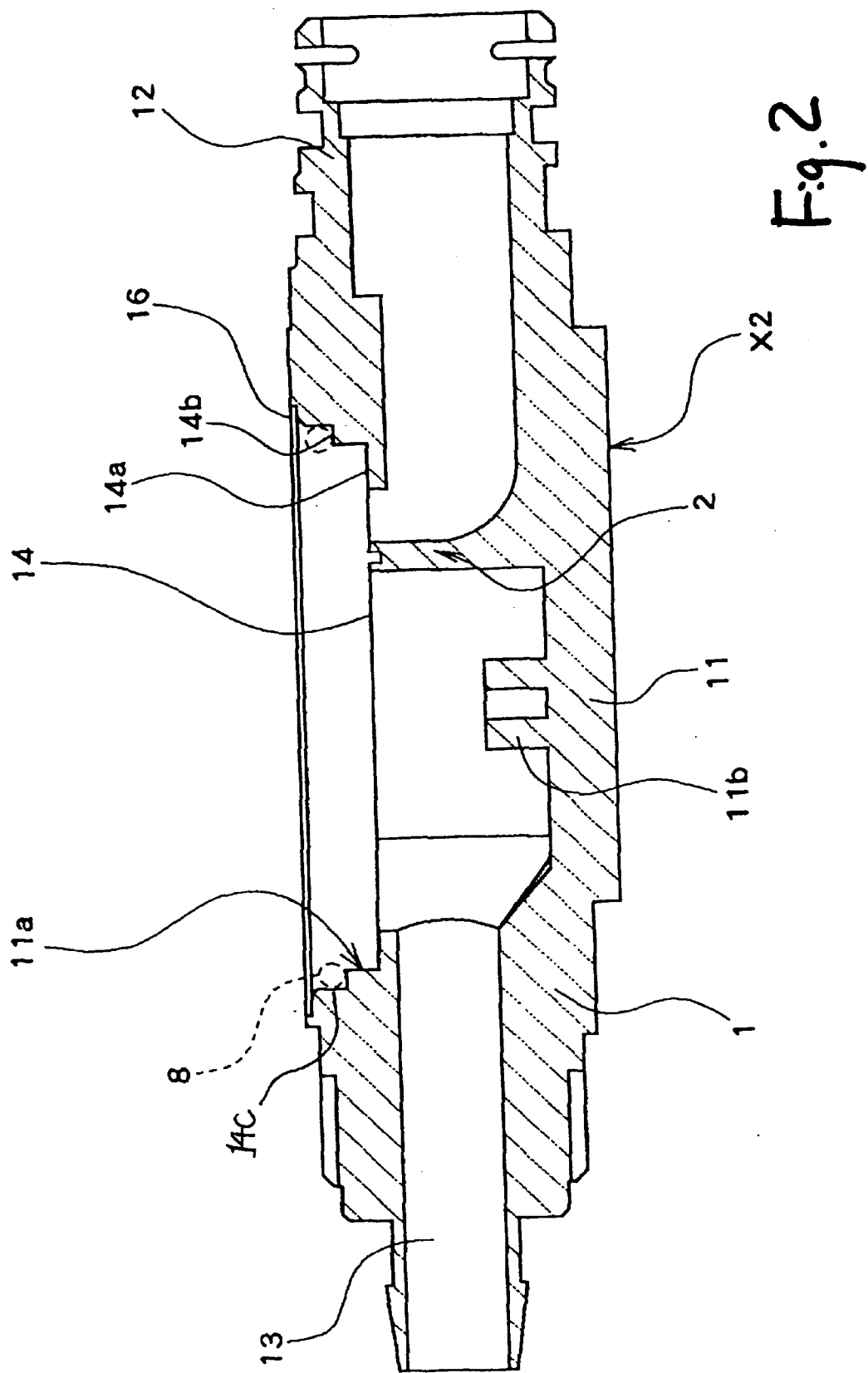
FIG. 2 is a longitudinal cross-sectional view of a body case which constitutes a first case.
Figure 3:
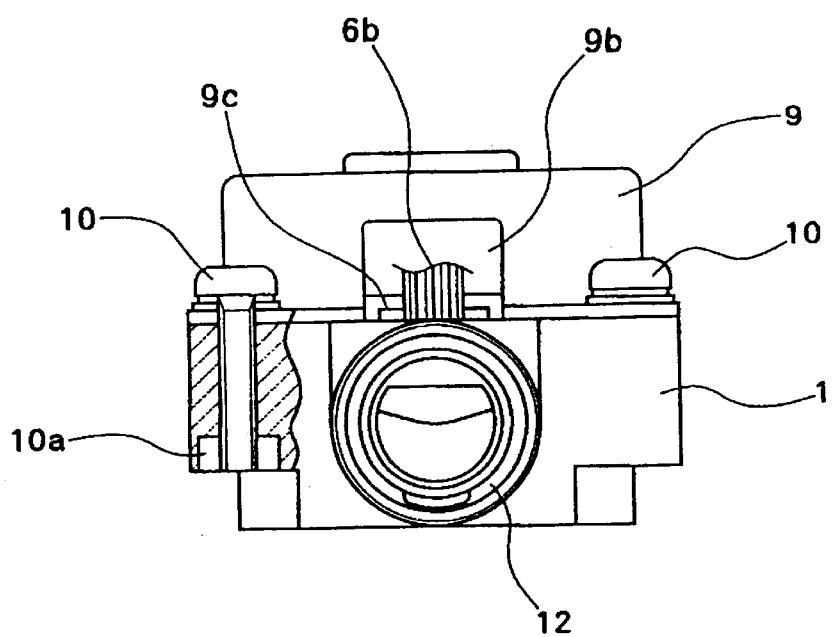
FIG. 3 is a side view taken in arrow III in FIG. 1.
Figure 4:
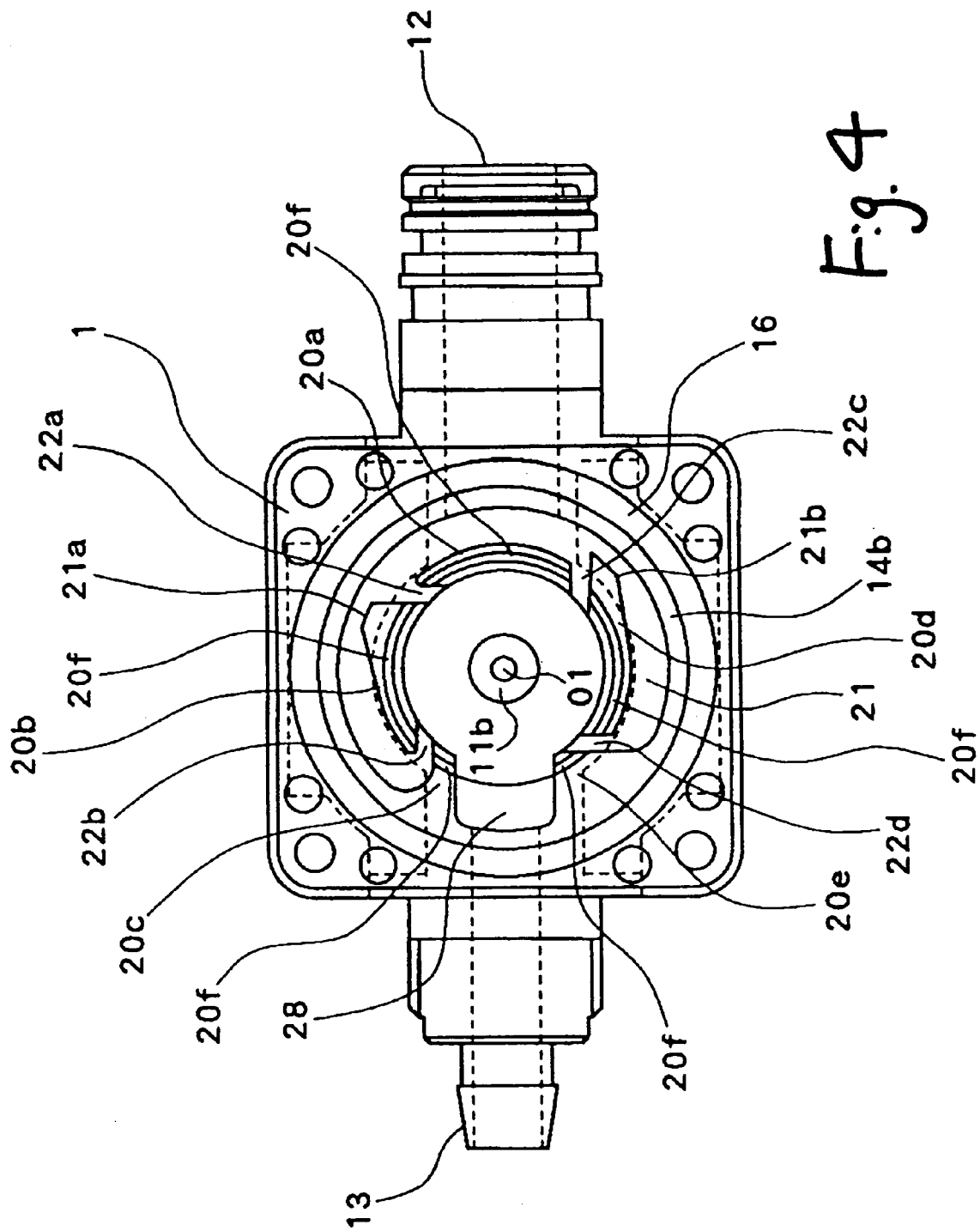
FIG. 4 is a plan view taken in arrow IV in FIG. 1 with a cup-shaped case serving as a second case, resin case serving as a third case and a stator portion being removed

FIG. 2 is a longitudinal cross-sectional view of a body case which constitutes a first case. FIG. 3 is a side view taken in arrow III in FIG. 3. FIG. 4 is a plan view taken in arrow IV with a stator portion, cup-shaped case and a cover being removed.

As seen from FIG. 1, the small-sized hydroelectric power generating apparatus according to this embodiment includes a first case (hereinafter referred to as a body case) 1 provided with an inlet 12 and outlet 13 of a fluid passage, a water-pouring portion 2 which constitutes a portion of the fluid passage provided within the body case 1, a waterwheel 3 which is arranged on the inner periphery of the water-pouring portion 2 and rotates with passage of a prescribed quantity of fluid, a rotating body 4 which is coupled with the waterwheel 3 and rotates with the waterwheel 3, a stainless cup-shaped case 5 which constitutes a second case arranged on the outer periphery of the rotating body 4, and a stator portion 6 which is arranged further outside the cup-shaped case 5. By press-fitting the cup-shaped case 5 into the body case 1 in an direction of arrow XI in FIG. 1, both cases 1 and 5 constitute a continuous internal space which is separated from the stator portion 6.

As seen from FIGS. 1 and 2, the body case 1 includes a body portion 11 and cylindrical inlet 12 and outlet 13 which outwardly protrude from the body portion 11. The body portion 11 includes a water-pouring portion 2 encircling the outside of the waterwheel 3, and a fitting portion 1a in which the above cup-shaped case 5 is to be fit. Inside the body portion 11, a bearing clearance 11b in which the one end of a shaft 7 supporting the rotor 4 is formed.

The water-pouring portion 2 serves to limit the passage of water entered from the inlet 12 to increase the force of water, to bump the water to a vane 31 and guide the bumped water to the outlet 3. The water-pouring portion 2 includes five water-pouring walls 20a, 20b, 20c, 20d and 20e (FIG. 4) formed integrally to the body case 1 and a cover 15 covering the hole at the tip sides of these water pouring wall 20a, 20b, 20c, 20d and 20e. The detailed structure of the water-pouring portion 2 will be described later.

In the fitting portion 11a, a concave portion 14 is provided which has a structure for receiving the cup-shaped case 5 and the one side in an axial direction of the stator portion 6 secured to 14 the outside of the cup-shaped case 5. The bottom 14a of the concave portion 14 constitutes a portion for placing a planar segment 15a of a doughnut-shaped cover 15 arranged between the body case 1 and the cup-shaped case 5. The center of the bottom 14a constitutes a hole for communicating the fluid passage of the body case 1 and the internal space of the cup-shaped case 5. The hole communicates the internal space of the cup-shaped case 5 with the inlet 12 and outlet 13 of the fluid passage.

Incidentally, the inner wall of the above concave portion 14 is in parallel to the shaft 7 which supports the rotating body 4, and is coincident to the direction (direction of arrow XI) of fitting the cup-shaped case 5. On the inner wall of the concave portion 14, a step 14b, which is defined by the fitting portion 11a serving as a small diameter portion and a large diameter portion 14c, is formed on the entire periphery thereof. The step 14b is superposed on the outside in an radial direction of the one side of the stator portion 6. An O-ring 8 which is a ring-shaped elastic sealing member is placed on the step 14b. Therefore, the O-ring 8 is partially superposed on the stator portion 6 in a direction (i.e. radial direction) orthogonal to the direction of fitting the cup-shaped case 5. This structure makes the hydroelectric generator according to this embodiment compact in the radial direction.

With the O-ring 8 being placed on the step 14b, as described above, the cup-shaped case 5 is pressed into the body case 1 so that it is press-fit into the concave portion 14. In this way, the opposite wall 5a of the cup-shaped case 5 is brought into contact with the inner wall having a smaller diameter which is formed inside of the radial direction from viewed the step 14b and on a deep side in the fitting direction (In FIG. 1, the contact position is represented by Y) so that the cup-shaped case 5 is positioned relative to the body case 1 in the radial direction. Accordingly, the inner wall inside viewed from the step 14b of the body case 1 serves as a portion for positioning the cup-shaped case 5 in the direction orthogonal to the direction of fitting the cup-shaped case 5.

The width of the O-ring 8 is wider than the gap formed between the inner wall of the step 14b and the opposite wall 5a so that the O-ring 8 is pushed outside in the radial direction by the opposite wall 5a of the cap-shaped case 5. Therefore, the O-ring 8 is interposed between the inner wall of the concave portion 14 and the opposite wall 5a of the cap-shaped case 5. Incidentally, the inner wall of the concave portion 14 and the opposite wall 5a are opposite to each other in the direction orthogonal to the direction of fitting the cup-shaped case 5. Therefore, the O-ring 8 is not crushed in the direction of fitting the cup-shaped case 5, but interposed in the direction orthogonal to the fitting direction, i.e. radial direction. Thus, the elastic repelling force of the O-ring 8 does not compete with the force of fitting the cup-shaped case. Thus, both cases 1 and 5 do not undergo IS distortion owing to the repelling force of the O-ring 8 having elastic force after it has been crushed. Accordingly, problems such as deterioration of the shaft accuracy due to the distortion and unstableness (float) of the members will not be presented.

Additionally, when the O-ring 8 is pressed in the radial direction as in this embodiment, the sealing effect for the sealed portion does not particularly alter as compared with the case where it is pressed in the axial direction. Specifically, even when the O-ring 8 is pressed in the direction orthogonal to the fitting direction, the internal space formed by both cases 1 and 5 is separated from the outside across the O-ring 8 so that both are sealed at the position of the O-ring.

Further, at the inlet position of the above concave portion 14, a very shallow step 16 is formed which has a larger radius than the concave portion 14. The step 16 constitutes a portion on which a flange 5b which is an outermost portion of the cup-shaped case 5 is placed and a projection 9a of a resin case 9 further outside the flange 5b is also fit. By bringing the outer portion of the projection 9a in the radial direction into contact with the inner wall of the body case 1 outside viewed from the step 16, the resin case 9 is positioned relative to the body case 1 in the radial direction. Further, by directly placing the flange 5b on the step 16, the cup-shaped case 5 is positioned relative to the body case 1 in the fitting direction (axial direction).

Further, as described above, after the cup-shaped case 5 has been fit in the body case 1 and the stator portion 6 has been arranged outside the cup-shaped case 5, the resin case 9 which is a third case is put on the cup-shaped case 5 and stator portion 6 so as to cover them. As seen from FIGS. 1 and 3, the resin case 9 includes a hood portion 9b which covers a terminal portion 6a protruding outwardly from the stator portion 6 in the radial direction. The hood portion 9b includes an extending portion 9c for outwardly extending the other end of a lead wire 6b with the one end connected to the terminal portion 6a. The extending portion 9c is filled with a sealant (not shown) for sealing the stator portion 6 from the outside, thus providing a structure which can prevent water from intruding into the stator portion 6 through the extending portion 9c from the outside.

As described above, the resin case 9 is positioned relative to the body case 1 in the radial direction. As seen from FIG. 3, a plurality of screws 10 are inserted in screw holes formed in the resin case 9 and body case 1 and nuts 10a are screwed at the tip of the screws 10 protruding into the body case 1, respectively so that the resin case 9 is securely screwed to the body portion 11 of the body case 1. Such a structure contribute to prevent the 14 cup-shaped case 5 and stator portion 6 falling from the body case 1 and deviating from their secured state.

The cup-shaped case 5 is made of non-magnetic stainless member, and processed by drawing to include a flange 5b which is an outermost segment, an opposite wall 5a which is continuous to the flange 5b to constitute a cylindrical segment located outside the flange 5b, a partition segment 5c which is arranged inside the opposite wall 5a to partition the internal space into which water intrudes from the stator portion 6, a coupling face segment 5d which couples the opposite wall 5a and the partition wall segment 5c and a bottom segment 5e.

The cup-shaped case 5 structured as described above is fit into the concave portion 14 at the fitting portion while it faces across the planar segment 15a of the cover 15. Incidentally, as described above, the O-ring 8 is arranged outside the opposite wall 5a. The O-ring 8 is interposed by the opposite wall 5a and inner wall of the concave portion 14 while it undergoes the pressing force from the opposite wall 5a outwardly in the radial direction. At the bottom 5e of the cup-shaped case 5, a bearing hole 5f is formed in which the other end of the shaft 7 supporting the waterwheel 3 and the rotating body 4 is fit. The cup-shaped case 5 separates the water passing through the body case 1 from the stator portion 6 and prevents the water from flowing out from the body case 1.

Additionally, the inlet 12, outlet 13 and body portion 11 coupling them, which are formed in the body case 1, are arranged at a part of in the fluid passage of the water faucet apparatus (not shown) composed of a faucet and valve. The fluid intruded in the inlet 12 from a fluid source passes the water-pouring portion 2 arranged internally in the body portion 11 and is discharged from the outlet 13. The fluid gives rotary force to the waterwheel 3 during the passage. A detailed explanation on the pertinent region will be given later.

In the body portion 11, the one end of the shaft 7 which supports the rotation of the waterwheel 3 and the rotating body 4 is supported. The one-end of the shaft 7 is fit in the bearing hole 11b formed in the body case 11 whereas the other end thereof is fit in a bearing hole 5f which passes the hole 15c of the cover 15 and the tip of which is provided in the cup-shaped case 5. Thus, the shaft 7 is held in cooperation by both cases 1 and 5. Incidentally, in the small-sized hydroelectric power generating apparatus according to this embodiment, both cases 1 and 5 are positioned in both axial and radial directions without undergoing the elastic repelling force from the O-ring 8 which is the elastic sealing member. Therefore, as long as the size accuracy of each of the components is great, the accuracy of assembling is also great, and the shaft accuracy of the shaft 7 both ends of which are supported by both case 1 and 5 which are different components is also great. This permits the accuracy of the rotary position of the waterwheel 3 and the rotating body 4 to be improved.

Now referring to FIG. 4, an explanation will be given of the water pouring portion 2. As described above, the water-pouring portion 2 is provided inside the body portion 11 of the body case 1. The water-pouring portion 2, as seen from FIG. 4, includes five water-pouring walls 20a, 20b, 20c, 20d and 20e formed upright and integrally to the body case 1 and a cover 15 (FIG. 1) which is arranged at the boundary between the body case 1 and the cup-shaped case 5. These water-pouring walls 20a, 20b, 20c, 20d and 20e are divisionally arranged so as to encircle the outer periphery of the vane 31 (not shown in FIG. 4, seen FIG. 1). The gaps between the water-pouring walls serve as four jetting holes 22a, 22b, 22c and 22d for spraying the water onto the vane 31.

A concave segment 20f is formed at the tip of each of the water-pouring walls 20a, 20b, 20c, 20d and 20e. The convex segments 15f of the cover 15 are fit into these concave segments so that the cover 15 is integrated to each of the water-pouring segments 20a, 20b, 20c, 20d and 20e. The tips of the water-pouring walls 20a, 20b, 20c, 20d and 20e formed as described above are formed on the same plane continuous to the step 14b described above.

The outer portions of these five water-pouring walls 20a, 20b, 20c, 20d and 20e in the radial direction, which are inside 5 the body portion 11 of the body case 1, constitute a grooved touring passage 21 along which the water intruded from the inlet 12 can move. Incidentally, the touring passage 21 is given a prescribed slope (R in FIG. 1) for appropriately distributing a flow rate from the side of the inlet of the fluid passage to each of the jetting ID holes 22a, 22b, 22c and 22d so as to decrease pressure loss.

The first pouring wall 20a is provided on the side of the inlet 12 so that the water intruded linearly from the inlet 12 into the body portion 11 bumps first against the outer periphery of the first water-pouring wall 20a. The bumped water braches at the first water-pouring wall 20a so that it moves counterclockwise along the touring passage to flow toward the second and the third water-pouring walls 20b and 20c and also moves clockwise to flow toward the fourth and the fifth water-pouring walls 20d and 20e.

The second water-pouring wall 20b is arranged adjacently to the first water-pouring wall 20 on its counterclockwise side. The adjacent ends of the first water-:pouring wall 20a and second water-pouring wall 20b are made substantially in parallel to each other. This gap portion serves as a first jetting hole 22a for jetting the water from the touring passage 21 to the vane of the waterwheel 31 arranged internally of the touring passage 21. The first jetting hole 22a is a square hole formed as a result that the planar portion 15a hangs over the portion between the first water-pouring wall 20a and second water-pouring wall 20b when the cover 15 is fit.

The third water-pouring wall 20c is arranged adjacently to the second water-pouring wall 20b on its counterclockwise side. The adjacent ends of the second water-pouring wall 20b and third water-pouring wall 20c are also made substantially in parallel to each other. This gap portion serves as a second jetting hole 22b. The fourth water-pouring wall 20d is arranged adjacently to the first water-pouring wall 20a on its clockwise side. The adjacent ends of the first water-pouring wall 20a and fourth water-pouring wall 20d are also made substantially in parallel to each other. This gap portion serves as a third jetting hole 22c. The fifth water-pouring wall 20e is arranged adjacently to the fourth water-pouring wall 20d on its counterclockwise side. The adjacent ends of the fourth water-pouring wall 20d and fifth water-pouring wall 20d are also made substantially in parallel to each other. This gap portion serves as a fourth jetting hole 22d. The two inner walls of each of the four jetting holes 22 (adjacent and opposite end faces of each water-pouring wall) are not formed linearly toward the rotary center o1, but formed to provide an angle so as to be vertically opposite to the vane 31 of the waterwheel 3.

An extended portion 21a extended out toward the touring passage 21 is formed at the outer peripheral side end of the second water-pouring wall 20b on the side of the first water-pouring wall 20a. This extended portion 21a is a portion against which the water, which has bumped against the first water-pouring wall 20a and moved counterclockwise, bumps. A part of the water which has bumped against the extended portion 21a is jet out toward the waterwheel 3 through the first jetting hole 22a.

An extended portion 21b having the same effect as that of the extended portion 21a is formed also at the outer peripheral side end of the fourth water-pouring wall 20d on the side of the first water-pouring wall 20a. Namely, this extended portion 21b is a portion against which the water, which has bumped against the first water-pouring wall 20a and moved clockwise, bumps. A part of the water which has bumped against the extended portion 21a is jet out toward the waterwheel 3 through the third jetting hole 22c.

A gap 28 is formed between the third water-pouring wall 20c and the fifth water-pouring wall 20e. The gap 28 is located between the opposite parallel ends of the third water-pouring wall 20c and the fifth water pouring wall 20e. The gap 28 is also located between the above outlet 13 and the rotary center position o1.

The cover 15, which is arranged on the side of the tips of the water-pouring walls 20a, 20b, 20c, 20d and 20e formed described above and placed on the step 16 of the body case 1, includes a doughnut-shaped planar segment 15a having a hole 15c at its center and a convex wall 15b extending upright on the one side of the planar segment. The convex wall 15b is arranged to run into a part of the gap 28 between the third water-pouring wall 20c and the fifth water-pouring wall 20e. Further, the square hole formed the gap 28 and convex wall 15b therein serves to communicate the area encircled by the water-pouring walls 20a, 20b, 20c, 20d and 20e with the outlet 13.

The waterwheel 3 arranged inside the five water-pouring walls 20a, 20b, 20c, 20d and 20e of the water-poring portion 2 rotates when the fluid at a prescribed flow rate passes. The rotating body 4 which is coupled with the waterwheel 3 and rotates with the waterwheel 3 constitutes a rotor portion arranged oppositely to the stator portion 6. The face of the rotor portion is set with cylindrical rotor magnet Mg. The outer surface of the rotor magnet Mg is magnetized at eight poles. This outer surface is opposite to the stator portion 6 across the partition 5c of the cup-shaped case 5. Therefore, the rotating body 4, when it rotates with the waterwheel 3, rotates relatively to the stator portion 6.

The stator portion 6 is composed of two layers 6a and 6b superposed in the axial direction. The layers 6a and 6b each includes an external yoke 61 (arranged outside in the superposed state), an external pole teeth 61a formed integrally to the external yoke, an internal yoke (arranged inside in the superposed state), an internal pole teeth 62a formed integrally to the internal yoke and a coil 63 wound around a coil bobbin. The starting and ending of the coil 63 are connected to the terminal portion 6a.

The stator portion 6 thus structured is fit in the outside of the partition 5c of the cup-shaped case 5. Therefore, a magnetic flux flows between each of the pole teeth 61a and 62a of the stator portion 6 and the magnetized portion of the rotating body 4. When the rotating body 4 rotates with the waterwheel 3 as described above, a change occurs in the flow of the magnetic flux. An induced voltage is generated in a direction preventing a change in the flow. The induced voltage is taken out from the terminal portion 6a. The induced voltage thus taken out is converted in a DC voltage by a circuit and further rectified by a predetermined circuit (not shown). The rectified voltage is charged in a battery.

Although the embodiments described above are preferred embodiments of this invention, this invention should not be limited to these embodiments, but can be realized in various modifications without departing from the spirit of the scope of this invention. For example, in the small-sized hydroelectric power generating apparatus according to the embodiments described above, the concave portion 14 was formed at the fitting portion 11a of the body case 1 in the cup-shaped case 5 and the cup-shaped case 5 was fit into the concave portion 14. However, a convex portion may be formed at the fitting portion 11a. In this case, at the fitting portion of the cup-shaped case 5 in the body case 1, an opposite wall facing the outer wall of the convex portion from further outside is formed, and a ring-shaped elastic sealing member is interposed by the opposite wall and the outer wall of the convex portion in the radial direction. In such a configuration also, both cases 1 and 5 can be coupled with each other without pressing the elastic sealing member in the axial direction. This improves the locating accuracy of both cases relative to each other and the accuracy of the shaft.

In the embodiment described above, the O-ring 8 serving as the elastic sealing member is placed on the step 14b of the concave portion 14, and thereafter the cup-shaped case 5 is fit in the concave portion. In this case, the O-ring 8 is pressed and interposed by the opposite wall 5a and outer wall 14b of the step 14 in the direction orthogonal to the fitting direction. The cup-shaped case 5 is positioned by an inner wall which is provided on the deep side in the fitting direction of the cup-shaped case 5 and is formed inside viewed from the step 14b in the radial direction.

However, the positioning portion of the cup-shaped case 5 in the radial direction may be not the deep side but this side in the fitting direction of the step 14b. Specifically, an area wider than the step 14 in the radial direction is formed on the deep side of the step 14b, and the O-ring 8 is previously fit in the wide area. In this case, the cup-shaped case 5 is positioned the inner wall which is formed on this side in the fitting direction from the step 14b and inside viewed from the step 14b in the radial direction, and fit on a further deep side by sliding insertion. At the deep side position of the step 14b, The O-ring 8 is pressed and interposed by the opposite wall 5a and the outer wall of the above wide area.

In the embodiment described above, the rotor portion and stator portion 6 which constitute a power generating section were formed as a two-layer stepping motor. However, the power generating section can be formed in various manners inclusive of a single-layer stepping motor or blushless motor.

In the embodiment described above, the positioning position of the cup-shaped case 5 in the radial direction when it is fit in the body case 1 was the inner wall more inside than the step 14b within the concave portion 14 of the body case 1. However, the positioning position in the radial direction may be the other position. For example, the flange 5b which is the outermost periphery of the cup-shaped case 5 is extended further outwards, and the outermost periphery of the flange 5b is brought into contact with the inner wall of the step 16 formed outside the concave portion 14 so that the contact position may be the positioning position.

In the embodiment described above, the O-ring 8 serving as the elastic sealing member was arranged to be superposed on the stator portion 6 in the radial direction, i.e. direction orthogonal to the fitting direction of both cases 1 and 5. However, the O-ring 8 may not be superposed on the stator portion 6. Therefore, in the embodiment described above, the opposite wall 5a of the cup-shaped case 5 is formed to bend in the same direction as the partition wall 5c when viewed from the coupling face segment 5d. However, it may be bent in the opposite direction, i.e. downward in FIG. 1 so that a part of the inner wall of the concave portion 14 is opposite to the outside of the opposite wall 5a in the radial direction and the O-ring is interposed by the opposite wall 5a and the inner wall of the concave portion 14.

In the embodiment described above, the water-pouring walls 20a, 20b, 20c, 20 d and 20e which constitute the water-pouring portion 2 for jetting water toward the waterwheel 3 were provided integrally to the body case 1. However, the ring-shaped member which encircles the waterwheel 3 may be formed separately from the body case 1.

In the embodiment described above, taking the use of "water circulation" in consideration and in order to prevent removal of the stator portion 6 and others, the resin case 9 put on the stator portion 6 was securely screwed to the body case 1. However, according to a use, waterproofing of the stator portion 6 from the outside is not required, and the strength of the stator portion 6 and others which can restrain their removal from the body case 1 can be assured. In such a case, provision of the resin case is not required. Further, for preventing the removal, the resin case 9 may be securely screwed to the body-case 1 so that filling the lead wire extending portion with the sealant can be done without.

The small-sized hydroelectric power generating apparatus according to this invention includes a continuous internal space formed when a first case and a second case are fit with each other, said first case having an inlet and an outlet of said fluid path and said second case having an internal space which communicates with said inlet and outlet and in which said rotating body is arranged and separating the internal space from the stator portion. The first case is provided with a concave or convex portion. The second case is provided with an opposite wall opposite to the inner wall of said concave portion or the outer wall of said convex portion. When the second case is fit into the first case while it is pressed, an elastic sealing member is provided which is interposed between said opposite wall and the inner wall of said concave portion or the outer wall of said convex portion in a direction orthogonal to the fitting direction.

Therefore, the elastic sealing member is not pressed in the fitting direction, the locating accuracy of both cases is improved without being influenced from the elastic repelling force. Hence, the accuracy of the shaft supporting the rotating body and supported by both cases in both ends thereof is also improved. Thus, a reliable small-sized hydroelectric power generating apparatus is provided which is difficult to generate poor sealing due to poor assembling and floating of the members. If the positioning portion for positioning said second case in a direction orthogonal to said fitting direction is provided, the locating accuracy of both cases is further improved, thus providing a further reliable small-sized hydroelectric power generating apparatus.

What is claimed is:

1. A small-sized hydroelectric power generating apparatus comprising:

a waterwheel arranged in a fluid path and rotating with passage of a prescribed flow rate of fluid is provided, a rotating body, coupled with the waterwheel and rotating therewith, serving used as a rotor portion arranged oppositely to a stator portion, and the rotor portion being rotated relatively to the stator portion with passage of the fluid to generate electric power;

a continuous internal space formed when a first case and a second case are fit to each other, said first case having an inlet and an outlet of said fluid path and said second case having the internal space which communicates with said inlet and outlet and in which said rotating body is arranged and separating the internal space from the stator portion, a concave or convex portion being provided at a fitting portion between said first case and said second case;

an opposite wall opposite to the inner wall of said concave portion or the outer wall of said convex portion being provided at the fitting portion between said first case and said second case;

a ring-shaped sealing member interposed between said opposite wall and the inner wall of said concave portion or the outer wall of said convex portion in a direction orthogonal to the direction of fitting said second case into said first case; and supporting portions provided with said first case and said second case, respectively, said supporting portions supporting both ends of a shaft supporting said rotating body.

2. A small-sized hydroelectric power generating apparatus according to claim 1, wherein said opposite wall and the inner wall of said concave portion or the outer wall of said convex portion are formed in parallel to the shaft supporting said rotating body.

3. A small-sized hydroelectric power generating apparatus according to claim 1, wherein said first case includes a positioning portion for positioning said second case in a direction orthogonal to said fitting direction.

4. A small-sized hydroelectric power generating apparatus according to claim 1, wherein said elastic sealing member is arranged to be laminated on said stator portion in the direction orthogonal to the fitting direction.

5. A small-sized hydroelectric power generating apparatus according to claim 3, wherein a concave portion is formed at the fitting portion between said first case and said second case, a step portion defined by a large diameter portion and a small diameter portion in a fitting direct-ion is formed on the inner wall of the said concave portion, a region located inside said small diameter portion serves as said positioning portion and said elastic sealing member is arranged on said large diameter portion.

6. A small-sized hydroelectric power generating apparatus according to claim 5, wherein said large diameter portion and said small diameter portion are arranged in said concave portion such that said small diameter portion and said large diameter portion are positioned in turn from an inner side to an outer side of the concave portion in said fitting direction.

7. A small-sized hydroelectric power generating apparatus according to claim 1, further comprising:

a third case put on said second case and said stator portion to cover them, and said third case securely screwed to the first case.

* * * * *